(12) United States Patent
Sakai et al.

(10) Patent No.: US 8,320,502 B2
(45) Date of Patent: Nov. 27, 2012

(54) DIGITAL DEMODULATING APPARATUS, DIGITAL RECEIVER, CONTROLLING METHOD OF THE APPARATUS, COMPUTER PROGRAM PRODUCT, AND RECORDING MEDIUM RECORDING THEREON THE PRODUCT

(75) Inventors: Takae Sakai, Yao (JP); Nobuyoshi Kaiki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1240 days.

(21) Appl. No.: 12/116,102

(22) Filed: May 6, 2008

(65) Prior Publication Data

US 2009/0041158 A1 Feb. 12, 2009

(30) Foreign Application Priority Data

Aug. 8, 2007 (JP) ................................ 2007-206692

(51) Int. Cl.
*H04L 27/00* (2006.01)
(52) U.S. Cl. ......... 375/324; 375/322; 375/316; 375/219
(58) Field of Classification Search .................. 375/324, 375/322, 316, 219; 340/825; 455/38, 343
See application file for complete search history.

(56) References Cited

U.S. PATENT DOCUMENTS

2007/0133493 A1* 6/2007 Maruhashi et al. ........... 370/342

FOREIGN PATENT DOCUMENTS

| JP | 2000-269759 A | 9/2000 |
| JP | 2005-86364 A | 3/2005 |
| JP | 2005-109912 A | 4/2005 |
| JP | 2008-141660 A | 6/2008 |

\* cited by examiner

*Primary Examiner* — Zewdu Kassa
(74) *Attorney, Agent, or Firm* — Birch, Stewart, Kolasch & Birch, LLP

(57) ABSTRACT

A digital demodulating apparatus comprises circuit components constituting a tuner that applies channel select processing to a received signal, and a demodulator that demodulates the signal to which the tuner has applied channel select processing; a power supply unit that supplies power to each circuit component; a reception condition detecting unit that detects a reception condition when the tuner receives the signal; a power adjusting unit that adjusts the power to be supplied to each circuit component by the power supply unit, on the basis of a result of the detection by the reception condition detecting unit; a fading environment estimating unit that estimates a fading environment when the tuner receives the signal; and a power controlling unit that controls the power adjusting unit on the basis of a result of the estimation by the fading environment estimating unit so that the number of times of adjustments of the power by the power adjusting unit per unit time changes in accordance with the variability of the reception condition.

23 Claims, 7 Drawing Sheets

DIGITAL DEMODULATING APPARATUS, DIGITAL RECEIVER, CONTROLLING METHOD OF THE APPARATUS, COMPUTER PROGRAM PRODUCT, AND RECORDING MEDIUM RECORDING THEREON THE PRODUCT

BACKGROUND OF THE INVENTION

1. Field of the Invention

The present invention relates to a digital demodulating apparatus, in particular, including means for controlling the power to be supplied; and also to a digital receiver, a controlling method of the apparatus, a computer program product, and a recording medium recording thereon the product.

2. Description of Related Art

In a digital demodulating apparatus, when the power is supplied to each circuit component constituting the apparatus, the magnitude of the power necessary for accurate demodulation processing varies in accordance with the signal reception condition. In general, on the assumption that the reception condition is the worst, a magnitude of power having a certain margin is supplied. However, when the reception condition is good, there is no necessity of supplying such a high power. Therefore, in order to reduce the power consumption, it is thinkable that the power to be supplied to each circuit component is controlled in accordance with the signal reception condition.

For example, Japanese Patent Unexamined Publication No. 2005-109912 discloses an apparatus that controls the power to be supplied while judging the signal reception condition. The apparatus includes an error correcting unit for correcting errors in a signal, and detects the error rate in the error correcting unit. When the apparatus judges on the basis of the detected error rate the reception condition to be good, the apparatus reduces the power to be supplied to its high frequency section. Thereby, the power consumption can be reduced. In this case, even when the reception sensitivity of the high frequency section is lowered due to the reduction in the power supplied to the section, the good reception condition can be kept while the error rate is not more than a reference value. On the other hand, when the error rate is more than the reference value, the apparatus judges the reception condition to be bad, and stops the reduction in the power to be supplied to the high frequency section. Thereby, the reception sensitivity of the high frequency section is intended to be improved so as to ensure a good reception condition.

However, there is a case that conditions for controlling the power do not correspond to the degree of the variation in the reception condition. For example, when the control conditions do not correspond to the variation in the reception condition, there is possibility that a power control operation is performed even though the variation in the reception condition is gentle and the reception condition merely temporarily varies. In this case, the power to be supplied may be increased as soon as the reception condition temporarily varies. This reduces the efficiency of the power control as a whole. In addition, when the reception condition frequently varies, there is possibility that the power control properly following the variation can not be ensured. Thus, the apparatus disclosed in the above publication has possibility that the power control can not properly be performed in accordance with the variation in the signal reception condition.

SUMMARY OF THE INVENTION

An object of the present invention is to provide a digital demodulating apparatus, a digital receiver, a controlling method of the apparatus, a computer program product, and a recording medium recording thereon the product, wherein a proper power control can be performed in accordance with a variation in the signal reception condition.

According to an aspect of the present invention, a digital demodulating apparatus comprises circuit components constituting a tuner that applies channel select processing to a received signal, and a demodulator that demodulates the signal to which the tuner has applied channel select processing; a power supply unit that supplies power to each circuit component; a reception condition detecting unit that detects a reception condition when the tuner receives the signal; a power adjusting unit that adjusts the power to be supplied to each circuit component by the power supply unit, on the basis of a result of the detection by the reception condition detecting unit; a fading environment estimating unit that estimates a fading environment when the tuner receives the signal; and a power controlling unit that controls the power adjusting unit on the basis of a result of the estimation by the fading environment estimating unit so that the number of times of adjustments of the power by the power adjusting unit per unit time changes in accordance with the variability of the reception condition.

According to another aspect of the present invention, a controlling method of a digital demodulating apparatus comprising circuit components constituting a tuner that applies channel select processing to a received signal, and a demodulator that demodulates the signal to which the tuner has applied channel select processing; and a power supply unit that supplies power to each circuit component, comprises a reception condition detecting step of detecting a reception condition when the tuner receives the signal; a power adjusting step of adjusting the power to be supplied to each circuit component by the power supply unit, on the basis of a result of the detection in the reception condition detecting step; a fading environment estimating step of estimating a fading environment when the tuner receives the signal; and a controlling step of controlling the power adjustment in the power adjusting step on the basis of a result of the estimation in the fading environment estimating step so that the number of times of adjustments of the power per unit time changes in accordance with the variability of the reception condition.

According to still another aspect of the present invention, a computer program product is provided for a digital demodulating apparatus comprising circuit components constituting a tuner that applies channel select processing to a received signal, and a demodulator that demodulates the signal to which the tuner has applied channel select processing; and a power supply unit that supplies power to each circuit component. The product causes the apparatus to execute a reception condition detecting step of detecting a reception condition when the tuner receives the signal; a power adjusting step of adjusting the power to be supplied to each circuit component by the power supply unit, on the basis of a result of the detection in the reception condition detecting step; a fading environment estimating step of estimating a fading environment when the tuner receives the signal; and a controlling step of controlling the power adjustment in the power adjusting step on the basis of a result of the estimation in the fading environment estimating step so that the number of times of adjustments of the power per unit time changes in accordance with the variability of the reception condition.

According to the invention, the fading environment is estimated, and a power adjustment is performed on the basis of the result of the estimation at a frequency in accordance with the variability of the reception condition. Therefore, power control can be performed in accordance with the variability of the fading environment so that the power is frequently adjusted in a frequent variation in the reception condition, and the power adjustment is held back in a gentle variation in the reception condition. Thus, the invention makes it possible to properly control the power in accordance with the variation in the reception condition.

In the present invention, the fading environment estimating unit preferably comprises a frequency deriving unit that derives a Doppler frequency of a Doppler shift that has been generated in the signal received by the tuner. In this feature of the invention, the Doppler frequency is derived to estimate the fading environment. Because the Doppler frequency corresponds to the variability of the reception condition, the fading environment can properly be estimated.

In the present invention, the power controlling unit preferably controls the power adjusting unit to increase the number of times of adjustments of the power by the power adjusting unit per unit time when the Doppler frequency derived by the frequency deriving unit exceeds a predetermined frequency reference value. In this feature of the invention, by frequently adjusting the power when the Doppler frequency is relatively high, a proper frequency of power controls can be ensured that corresponds to a fading environment in which the reception condition relatively frequently varies.

In the present invention, the power controlling unit preferably controls the power adjusting unit to decrease the number of times of adjustments of the power by the power adjusting unit per unit time when the Doppler frequency derived by the frequency deriving unit becomes less than a predetermined frequency reference value. If the power is frequently adjusted when the Doppler frequency is relatively low, the power control efficiency may be reduced as a whole. This is because the power may be changed in accordance with a temporarily variation in the reception condition though the reception condition varies a little in a long time. Contrastingly in the above feature of the invention, when the Doppler frequency is relatively low, the frequency of power adjustments is held down and thus the number of times of power controls is decreased. This ensures a proper frequency of power controls corresponding to a gentle variation in the reception condition.

In the present invention, it is preferable that the apparatus further comprises an evaluation value deriving unit that derives at least one of a modulation error ratio (MER) value and a bit error rate (BER) value when the signal is demodulated, the reception condition detecting unit detects the reception condition on the basis of a result of the derivation by the evaluation value deriving unit over a predetermined time period, and the power controlling unit controls the reception condition detecting unit to shorten the predetermined time period when the Doppler frequency derived by the frequency deriving unit exceeds a predetermined frequency reference value. In this feature of the invention, when the Doppler frequency is relatively high, the period is shortened for detecting the reception condition. Thereby, a detection result is obtained that properly reflects a frequent variation in the reception condition. Thus, a power control can be performed that properly corresponds to the variation in the reception condition.

In the present invention, it is preferable that the apparatus further comprises an evaluation value deriving unit that derives at least one of a modulation error ratio (MER) value and a bit error rate (BER) value when the signal is demodulated, the reception condition detecting unit detects the reception condition on the basis of a result of the derivation by the evaluation value deriving unit over a predetermined time period, and the power controlling unit controls the reception condition detecting unit to lengthen the predetermined time period when the Doppler frequency derived by the frequency deriving unit becomes less than a predetermined frequency reference value. If the detection period for the reception condition is short when the Doppler frequency is relatively low, the power control efficiency may be reduced as a whole. This is because the detection result may reflect a temporarily variation in the reception condition though the reception condition varies a little in a long time. Contrastingly in the above feature of the invention, the detection period is lengthened so that the detection result is hard to reflect any merely temporarily variation. This ensures a proper power control corresponding to a gentle variation in the reception condition.

In the present invention, the power controlling unit preferably controls the power adjusting unit to increase the number of times of adjustments of the power by the power adjusting unit per unit time when the Doppler frequency derived by the frequency deriving unit exceeds a first frequency reference value, and to decrease the number of times of adjustments of the power by the power adjusting unit per unit time when the Doppler frequency derived by the frequency deriving unit becomes less than a second frequency reference value that is not more than the first frequency reference value. In this feature of the invention, the power is frequently adjusted when the Doppler frequency is relatively high, while the power is less frequently adjusted when Doppler frequency is relatively low. This ensures a proper frequency of power controls corresponding to both of frequent and gentle variations in the reception condition.

In the present invention, it is preferable that the apparatus further comprises an evaluation value deriving unit that derives at least one of a modulation error ratio (MER) value and a bit error rate (BER) value when the signal is demodulated, the reception condition detecting unit detects the reception condition on the basis of a result of the derivation by the evaluation value deriving unit over a predetermined time period, and the power controlling unit controls the reception condition detecting unit to shorten the predetermined time period when the Doppler frequency derived by the frequency deriving unit exceeds a first frequency reference value, and to lengthen the predetermined time period when the Doppler frequency derived by the frequency deriving unit becomes less than a second frequency reference value that is not more than the first frequency reference value. In this feature of the invention, when the Doppler frequency is relatively high, the detection period for the reception condition is shortened so that a detection result can be obtained that properly reflects a frequent variation in the reception condition. Contrastingly, when the Doppler frequency is relatively low, the detection period is lengthened so that the detection result is hard to reflect a merely temporarily variation. This ensures proper power controls corresponding to both of frequent and gentle variations in the reception condition.

In the present invention, the power controlling unit preferably allows the power adjusting unit to adjust the power only when the Doppler frequency derived by the frequency deriving unit is within a range in which the power to be supplied to each circuit component can be reduced. In this feature of the invention, because no power adjustment is performed in the case of a Doppler frequency that does not allow the power to be reduced, a control is performed that properly corresponds to the reception condition.

According to still another aspect of the present invention, a digital demodulating apparatus comprises circuit components constituting a tuner that applies channel select processing to a received signal, and a demodulator that demodulates the signal to which the tuner has applied channel select processing; a power supply unit that supplies power to each circuit component; an evaluation value deriving unit that derives as an evaluation value of the reception condition at least one of a modulation error ratio (MER) value and a bit error rate (BER) value when the signal is demodulated; a reception condition detecting unit that compares a result of the derivation by the evaluation value deriving unit with a reference value relating to the evaluation value, and outputs a result of the comparison as a detection result of the reception condition when the tuner receives the signal; a power adjusting unit that adjusts the power to be supplied to each circuit component by the power supply unit, on the basis of the result of the detection by the reception condition detecting unit; a fading environment estimating unit that estimates a fading environment when the tuner receives the signal; and a reference value changing unit that changes the reference value relating to the evaluation value into a value in accordance with the variability of the reception condition, on the basis of a result of the estimation by the fading environment estimating unit.

According to still another aspect of the present invention, a controlling method of a digital demodulating apparatus comprising circuit components constituting a tuner that applies channel select processing to a received signal, and a demodulator that demodulates the signal to which the tuner has applied channel select processing; and a power supply unit that supplies power to each circuit component, comprises an evaluation value deriving step of deriving as an evaluation value at least one of a modulation error ratio (MER) value and a bit error rate (BER) value when the signal is demodulated; a comparing step of comparing a result of the derivation in the evaluation value deriving step with a reference value relating to the evaluation value; a reception condition detecting step of detecting the reception condition when the tuner receives the signal, on the basis of a result of the comparison in the comparing step; a power adjusting step of adjusting the power to be supplied to each circuit component by the power supply unit, on the basis of a result of the detection in the reception condition detecting step; a fading environment estimating step of estimating a fading environment when the tuner receives the signal; and a reference value changing step of changing the reference value relating to the evaluation value into a value in accordance with the variability of the reception condition, on the basis of a result of the estimation in the fading environment estimating step.

According to still another aspect of the present invention, a computer program product is provided for a digital demodulating apparatus comprising circuit components constituting a tuner that applies channel select processing to a received signal, and a demodulator that demodulates the signal to which the tuner has applied channel select processing; and a power supply unit that supplies power to each circuit component. The product causes the apparatus to execute an evaluation value deriving step of deriving as an evaluation value at least one of a modulation error ratio (MER) value and a bit error rate (BER) value when the signal is demodulated; a comparing step of comparing a result of the derivation in the evaluation value deriving step with a reference value relating to the evaluation value; a reception condition detecting step of detecting the reception condition when the tuner receives the signal, on the basis of a result of the comparison in the comparing step; a power adjusting step of adjusting the power to be supplied to each circuit component by the power supply unit, on the basis of a result of the detection in the reception condition detecting step; a fading environment estimating step of estimating a fading environment when the tuner receives the signal; and a reference value changing step of changing the reference value relating to the evaluation value into a value in accordance with the variability of the reception condition, on the basis of a result of the estimation in the fading environment estimating step.

According to those aspects of the present invention, the power is adjusted on the basis of the reference value relating to the MER or BER value. More specifically, for example, when the MER value exceeds the reference value and thus the reception condition is considered relatively bad, a control is performed to increase the power to be supplied to each circuit component. The reference value is changed in accordance with the variability of the reception condition. Thus, for example, a control can be performed so that the reference value is decreased to make it easy to change the power in the case of a fading environment in which the reception condition frequently varies, while the reference value is increased to make it hard to change the power in the case of a fading environment in which the reception condition gently varies. This realizes a proper power control corresponding to the variation in the reception condition. Like the former aspects, the Doppler frequency may be derived to estimate the fading environment.

In the present invention, the reference value changing unit preferably changes the reference value relating to the evaluation value so that the comparison result of the reception condition detecting unit becomes harder to indicate that the reception condition is good when the Doppler frequency derived by the frequency deriving unit exceeds a predetermined frequency reference value. In this feature of the invention, when the Doppler frequency is relatively high, the reference value for detecting the reception condition is changed so that the reception condition is apt to be judged not to be good. Thus, in the case of a fading environment in which the reception condition frequently varies, the reception condition is apt to be judged not to be good. This ensures a power control that can properly correspond to a condition in which the reception condition is apt to vary and to frequently become bad.

In the present invention, the reference value changing unit preferably changes the reference value relating to the evaluation value so that the comparison result of the reception condition detecting unit becomes more apt to indicate that the reception condition is good when the Doppler frequency derived by the frequency deriving unit becomes less than a predetermined frequency reference value. If the reception condition is apt to be judged not to be good when the Doppler frequency is relatively low, the power control efficiency may be reduced. This is because the power may be increased in accordance with a temporarily variation in the reception condition though the reception condition varies a little in a long time. Contrastingly in the above feature of the invention, when the Doppler frequency is relatively low, the reference value for detecting the reception condition is changed so that the reception condition is apt to be judged to be good. By making the reception condition apt to be judged to be good, for example, it is suppressed that the power is apt to be increased, and thus the reduction in the power control efficiency is suppressed.

In the present invention, the reference value changing unit preferably changes the reference value relating to the evaluation value so that the comparison result of the reception condition detecting unit becomes harder to indicate that the reception condition is good when the Doppler frequency derived by the frequency deriving unit exceeds a first frequency reference value; and more apt to indicate that the reception condition is good when the Doppler frequency derived by the frequency deriving unit becomes less than a second frequency reference value that is not more than the first frequency reference value. In this feature of the invention, in the case of a fading environment in which the reception condition frequently varies, the reception condition is made apt to be judged not to be good. Contrastingly, in the case of a fading environment in which the reception condition gently varies, the reception condition is made apt to be judged to be good. This ensures proper power controls corresponding to both of frequent and gentle variations in the reception condition.

In the present invention, the reference value changing unit preferably changes the reference value relating to the evaluation value so that the comparison result of the reception condition detecting unit becomes harder to indicate that the reception condition is good when the Doppler frequency derived by the frequency deriving unit becomes less than a third frequency reference value that is less than the second frequency reference value. When the Doppler frequency is very low, there is possibility of generation of a sudden variation in the reception condition in a very long cycle. In the above feature of the invention, however, when the Doppler frequency is particularly low, the reception condition is made apt to be judged not to be good. This makes it possible to cope with such a sudden variation.

In the present invention, the power adjusting unit preferably adjusts the power to be supplied to each circuit component so that the power is reduced as the goodness of the reception condition indicated by the detection result of the reception condition detecting unit is improved. In this feature of the invention, because the power to be supplied to each circuit component is reduced as the goodness of the reception condition is improved, the power consumption of each circuit component can be suppressed in accordance with the reception condition.

Computer program products of the present invention can be distributed in a form of being recorded on computer-readable recording media including removable type recording media such as compact disc read only memory (CD-ROM) disks, flexible disks (FDs), and magneto optical (MO) disks, and fixed type recording media such as hard disks. The computer program products can be also distributed by wired or wireless electric communication means via a communication network such as the Internet. Such a computer program product may not be exclusive to the digital demodulating apparatus. By using in combination with computer programs for channel select processing and digital demodulation processing, the computer program product may cause a general-purpose information processing apparatus including a general-purpose processor and so on to function as the digital demodulating apparatus.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1A:
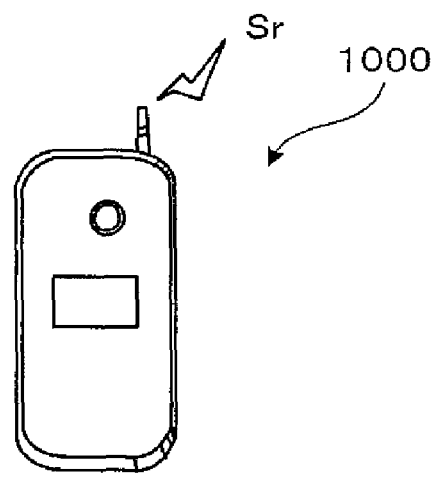
FIG. 1A is a front view of a cellular phone according to an embodiment of the present invention.
Figure 1B:
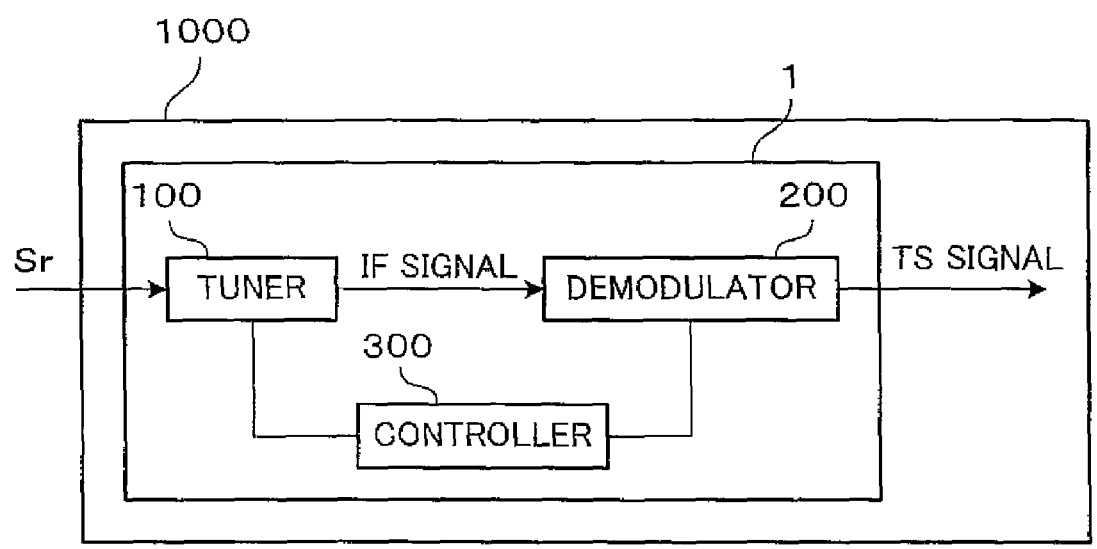
FIG. 1B is a block diagram showing a constitution of a digital demodulating apparatus included in the cellular phone.

Hereinafter will be described a preferred embodiment of the present invention. FIG. 1A is a front view of a cellular phone 1000 according to the embodiment. FIG. 1B is a block diagram showing a constitution of a digital demodulating apparatus 1 included in the cellular phone 1000.

The cellular phone 1000 of this embodiment includes therein a digital demodulating apparatus 1. The digital demodulating apparatus 1 demodulates a signal Sr received by the cellular phone 1000 through its antenna. Information on data of characters, an image, sound, or a computer program, is taken out from a demodulated signal output from the digital demodulating apparatus 1, and the data is reproduced. The characters, image, and so on, are provided to a user of the cellular phone 1000 through a not-shown display and a not-shown speaker provided on the phone 1000. In a modification, the digital demodulating apparatus 1 may be adopted in another digital receiver than such a cellular phone, for example, a digital television (TV) receiver, a wireless local area network (LAN) device, or a personal computer (PC) using wireless LAN.

The digital demodulating apparatus 1 includes a tuner 100, a demodulator 200, and a controller 300. The tuner 100 is electrically connected to the demodulator 200. The tuner 100 is also electrically connected to an antenna and applies channel select processing to a signal Sr received through the antenna. That is, the tuner 100 selects a single channel out of a number of channels contained in the signal Sr sent from the antenna, and receives the single channel. The tuner 100 then converts the signal of the selectively received channel into an intermediate frequency (IF) signal, which is sent to the demodulator 200. The demodulator 200 receives the IF signal sent from the tuner 100; demodulates the IF signal; and then outputs the demodulated signal. The demodulated signal is, for example, a so-called transport stream (TS) signal. The controller 300 sends various control instructions to the tuner 100 and the demodulator 200 to control the operations of them.

The digital demodulating apparatus 1 is made up of a number of circuit components. If not otherwise specified in the below description, each circuit component may be constituted by a group of circuit elements each specialized so as to serve an independent function; or may be realized by hardware devices such as a general-purpose processor, and computer programs that cause the hardware devices such as the processor to operate so as to serve the respective functions as will be described later. In the latter case, each circuit component is realized by the combination of the hardware devices and the computer programs.

<Received Signal>

Next will be described a received signal to be received by the cellular phone 1000. The received signal to be received by the cellular phone 1000 is transmitted by a number of subcarriers. In the below example of this embodiment, the orthogonal frequency division multiplexing (OFDM) method is adopted for transmitting the signal to be received by the cellular phone 1000.

A signal according to the OFDM method is in the form of a signal train in which a large number of symbols each having a prescribed length are sequentially arranged. Each symbol contains a number of unit signals superimposed on each other. The unit signals are obtained by modulating subcarriers different in frequency, in accordance with data having a predetermined data length. Each symbol contains a guard interval at a portion other than the effective portion that contains data. The guard interval that has the same signal component as a portion of the rear end of the effective portion, is disposed at the front end of the symbol. The guard interval is used for removing from the received signal the influence of a number of multipath waves generated in the transmission path from a transmission station that transmitted the signal, to the cellular phone 1000. The length of the effective portion contained in one symbol is called effective symbol length.

The OFDM signal further contains a number of scattered pilot signals. When the unit signals contained in the received signal are arranged in a plane defined by an axis of time and an axis of frequency, the scattered pilot signals contained in the OFDM signal are arranged at regular intervals along either of the axis of time and the axis of frequency. The scattered pilot signals form a numeric sequence that is represented according to a prescribed coding method or the like, and has been inserted in the received signal in a predetermined arrangement order. In other words, the scattered pilot signals are arranged in the received signal so that the numeric sequence represented according to the prescribed coding method is reproduced when the numeric values indicated by the respective scattered pilot signals are taken in the predetermined arrangement order in the received train. In this embodiment, each of subcarriers having the same frequency contains at least two scattered pilot signals having the same I value and the same Q value, between which signals a predetermined number of symbols are interposed.

Further, the received signal supposed in this embodiment has received various kinds of interleaving processes and various kinds of coding processes in order that error correction can be performed to correct errors generated in the received signal. For example, for coding, Reed-Solomon (RS) coding and Viterbi coding are used. For interleaving used are bit interleaving, byte interleaving, time interleaving, and frequency interleaving. Interleaving as described above is to rearrange temporally or in frequency, data corresponding to signals contained in a transmitted signal. By applying demodulation processing and deinterleave processing, which will be described later, in the cellular phone 1000 to the received signal to which various kinds of coding processes and various kinds of interleaving processes have been applied, errors contained in the received signal can be corrected.

The received signal supposed in this embodiment can be applied to, for example, a transmission system according to Japanese digital terrestrial broadcasting. For the Japanese digital terrestrial broadcasting, the integrated services digital broadcasting-terrestrial (ISDB-T) system is adopted.

<Tuner>

Figure 2:
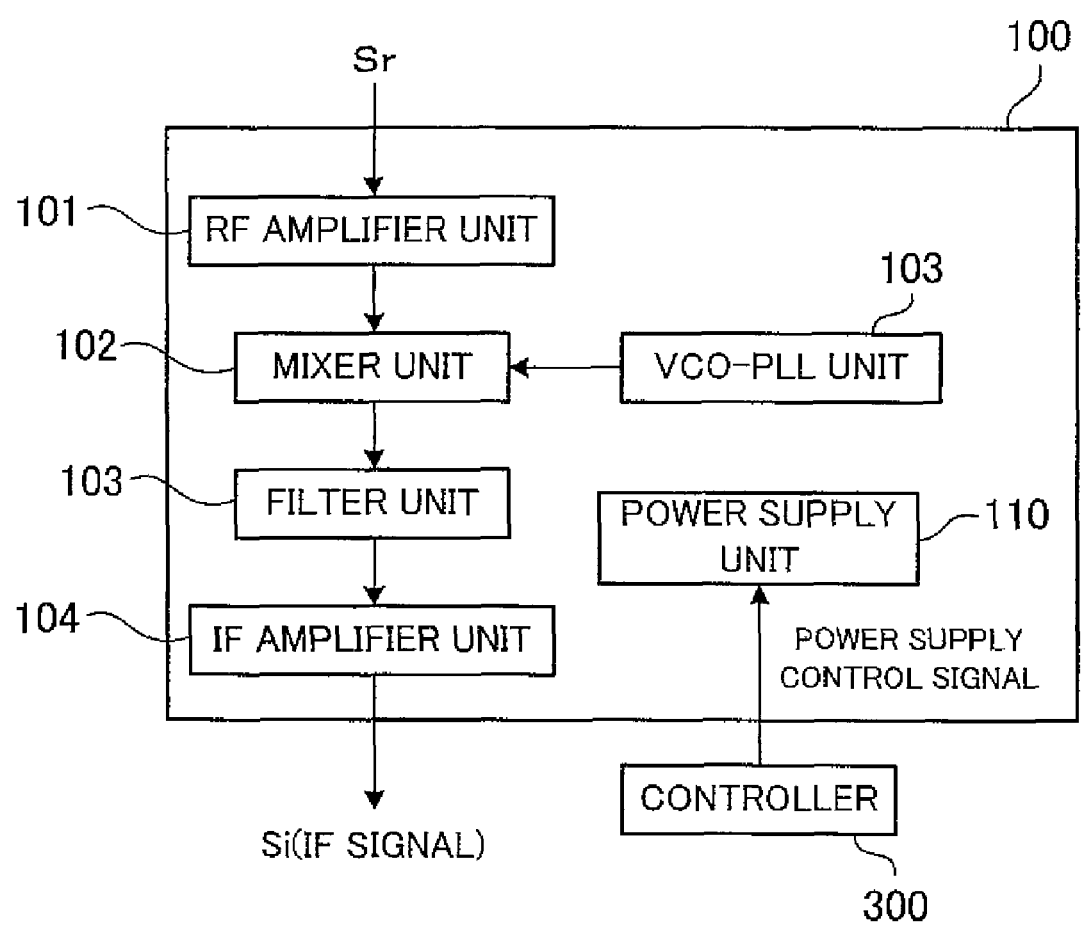
FIG. 2 is a block diagram showing a constitution of a tuner shown in FIG. 1B.

FIG. 2 is a block diagram showing a constitution of the tuner 100. The tuner 100 includes a number of circuit components such as an RF amplifier unit 101, a mixer unit 102, a VCO-PLL unit 103, a filter unit 104, and an IF amplifier unit 105. The signal Sr input to the tuner 100 is amplified by the RF amplifier unit 101, and then output to the mixer unit 102. The VCO-PLL unit 103 generates a mixing signal based on a frequency corresponding to a specific channel, which is channel select processing. The mixing signal generated by the VCO-PLL unit 103 is output to the mixer unit 102. The mixer unit 102 generates an IF signal Si according to an IF frequency from the signal Sr output from the RF amplifier unit 101 and the mixing signal output from the VCO-PLL unit 103.

The IF signal Si generated by the mixer unit 102 is output to the filter unit 104. The filter unit 104 removes unnecessary signal components from the signal Si output from the mixer unit 102. The signal Si from which the unnecessary signal components have been removed, is output to the IF amplifier unit 105. The IF amplifier unit 105 amplifies the signal Si output from the filter unit 104, and then outputs the amplified signal Si to the demodulator 200.

<Demodulator>

Figure 3:
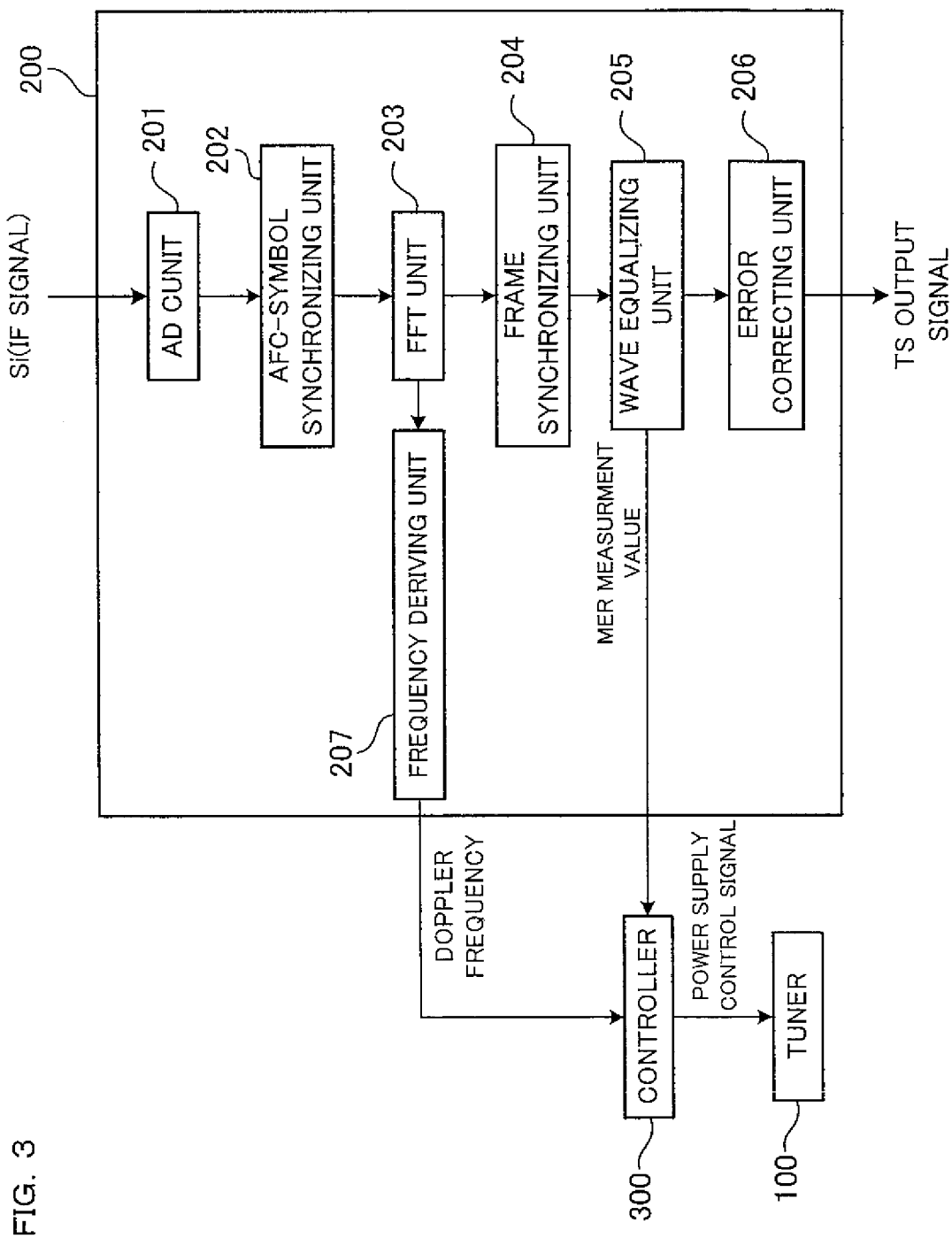
FIG. 3 is a block diagram showing a constitution of a demodulator shown in FIG. 1B.

Next will be described the demodulator 200. FIG. 3 is a block diagram showing a constitution of the demodulator 200. As shown in FIG. 3, the demodulator 200 is constituted by a number of circuit components such as an ADC unit 201, which will be described below.

The demodulator 200 includes an ADC unit 201, an AFC-symbol synchronizing unit 202, a fast Fourier transform (FFT) unit 203, a frame synchronizing unit 204, a wave equalizing unit 205, and an error correcting unit 206. The IF signal Si output from the tuner 100 is input to the ADC unit 201. The ADC unit 201 converts the input analogue signal Si into a digital signal, and outputs the converted digital signal to the AFC-symbol synchronizing unit 202.

The AFC-symbol synchronizing unit 202 applies filter processing and so on to the digital signal output from the ADC unit 201. The AFC-symbol synchronizing unit 202 determines the start point of Fourier transform by the FFT unit 203 as will be described later, that is, a symbol synchronization point, and executes symbol synchronization. The AFC-symbol synchronizing unit 202 then outputs the synchronized digital signal to the FFT unit 203. In a modification, the AFC-symbol synchronizing unit 202 may send information on the symbol synchronization point to the controller 300. In another modification, the AFC-symbol synchronizing unit 202 may derive information on a mode indicating an effective symbol length, and send the information to the controller 300.

In the ISDB-T system, modes indicating effective symbol lengths include a mode 1 of an effective symbol length of 252 microseconds, a mode 2 of an effective symbol length of 504 microseconds, and a mode 3 of an effective symbol length of 1008 microseconds. When the symbol synchronization point is determined, a point that makes it possible to realize the most suitable reception having the least affection of multipath waves, is set to the synchronization point. As a method of determining the synchronization point, a method is used in which correlation of signals is referred to; in which phase shift is corrected with the use of pilot signals such as scattered pilot signals; or the like.

The FFT unit 203 converts by time-frequency Fourier transform the digital signal output from the AFC-symbol synchronizing unit 202. For this Fourier transform, so-called fast Fourier transform (FFT) is used in general. The FFT unit 203 sequentially outputs digital signals to which Fourier transform has been applied, to the frame synchronizing unit 204.

The frame synchronizing unit 204 synchronizes each digital signal output from the FFT unit 203, in a unit of frame. One frame is constituted by, for example, 204 symbols, and a batch of TMCC information is obtained from one frame signal. The digital signal synchronized by the frame synchronizing unit 204 is output to the wave equalizing unit 205.

On the basis of scattered pilot signals contained in the digital signal, the wave equalizing unit 205 applies wave equalization to the digital signal synchronized by the frame synchronizing unit 204. The wave equalization is one of signal correcting processes to correct a shift of constellation from a reference value, that has occurred in each unit signal. Such a shift of constellation from the reference value mainly occurs due to noise generated on the signal transmission path.

The wave equalization is performed as follows. First, the wave equalizing unit 205 extracts scattered pilot signals from the signal output from the frame synchronizing unit 204. On the other hand, the wave equalizing unit 205 sequentially generates, as reference signals, signals that indicate the numeric sequence based on the prescribed coding method used for the scattered pilot signals. The wave equalizing unit 205 then divides each extracted scattered pilot signal by the corresponding reference signal generated.

Next, the wave equalizing unit 205 interpolates the above division results along either of an axis of time and an axis of frequency. For the interpolation used is a linear interpolation method, a maximum likelihood estimation method, or the like. The wave equalizing unit 205 then divides by each interpolated numeric value the corresponding unit signal contained in the signal output from the frame synchronizing unit 204. The wave equalization is thus applied to the signal. The unit signals to which the wave equalization has been applied are demapped to data items each having a predetermined data length.

Demapping is processing for deriving an I value and a Q value indicated by each wave-synchronized unit signal on the basis of the corresponding constellation reference value. When a wave-synchronized unit signal contains an error, the I value and the Q value obtained directly from the unit signal have shifted from the constellation reference value. Thus, the wave equalizing unit 205 compares with the constellation reference value the I value and the Q value obtained directly from the wave-synchronized unit signal; and then calculates a modulation error ratio (MER) from the errors obtained by the comparison. In this case, the wave equalizing unit 205 functions as an evaluation value deriving unit. The MER measurement values for the respective unit signals measured by the wave equalizing unit 205 are output to the controller 300 in the order of the wave equalization processes applied to the unit signals.

The MER indicates the degree of the shift from the constellation reference value the I value and the Q value obtained directly from each wave-synchronized unit signal. On the other hand, the MER corresponds to a ratio of carrier power to noise power, that is, CN ratio. In this embodiment, the MER is calculated so that the higher value of the MER indicates the smaller quantity of noise relative to the intensity of the received signal. Therefore, a high MER value corresponds to a high CN ratio, and thus corresponds to a good signal reception condition. Conversely, a low MER value corresponds to a low CN ratio, and thus corresponds to a not-good signal reception condition. As will be described later, the controller judges the degree of the goodness of the signal reception condition on the basis of the MER measurement value sent from the demodulator 200; and performs various controls in accordance with the judgment results.

The error correcting unit 206 applies error correction to the signal output from the wave equalizing unit 205. The error correction includes deinterleaving processes and a decoding process, which respectively correspond to the interleaving processes and the coding processes applied to the signal on the transmission side. The digital signal to which various kinds of interleaving processes have been applied is restored by the deinterleaving processes to the digital signal before interleaving. In addition, the coded digital signal is restored by the decoding process to the digital signal before coding. Thereby, various kinds of errors are corrected that are contained in the signal by passing through the transmission path. In a modification, the error correcting unit 206 may measure the quantity of error corrections when applying the error correction to the digital signal, and calculate the bit error rate (HER). The calculated BER may be output to the controller 300. In this case, the error correcting unit 206 functions as an evaluation value deriving unit.

The digital signal to which the demodulator 200 has applied demodulation as described above is output from the demodulator 200 as a TS signal.

<Power Supply Control>

In a circuit component included in the tuner 100, such as the RF amplifier unit 101, the output signal of the circuit component may contain a signal component nonlinear to its input signal. For example, a nonlinear signal component contained in the output signal of an analogue circuit is generated because the input signal to the analogue circuit contains an interference component other than the target wave component. The higher the intensity of the interference component, the higher the intensity of the nonlinear component contained in the output signal. Such an interference occurs when two or more transmission paths exist from the signal transmission source to the cellular phone 1000; when another signal exists in a frequency band neighboring the target wave; or the like. An interference component contained in the signal Si output from the tuner 100 causes a noise component of the signal. When such a noise component is too large, there is possibility that image data and so on can not accurately be reproduced on the basis of the signal demodulated by the demodulator 200.

On the other hand, the linearity of a circuit component may vary in accordance with the power supplied to the circuit component. For example, in an analogue circuit, the linearity of its output signal to its input signal is improved as the power supplied to the circuit component increases.

Therefore, when the signal reception condition of the cellular phone 1000 is not good and the received signal of the tuner 100 contains an interference other than the target wave, the power to be supplied to a circuit component is increased to improve the linearity of the circuit component. This can suppress the nonlinear component contained in the signal Si to be output from the tuner 100. On the other hand, when the signal reception condition of the cellular phone 1000 is good, the signal received by the cellular phone 1000 contains a little interference. Therefore, even when the linearity of the circuit component is not so improved, the nonlinear component may not increase to a problematic degree. If the power to be supplied to the circuit component is increased even in that case, the power consumption of the tuner 100 may be excessive.

As shown in FIG. 2, the tuner 100 of this embodiment includes a power supply unit 110. The power supply unit 110 supplies power to each of the RF amplifier unit 101, the mixer unit 102, the filter unit 104, and the IF amplifier unit 105. The RF amplifier unit 101 and so on operate by the power supplied from the power supply unit 110. The power supply unit 110 receives from the controller 300 a power supply control signal that indicates the intensity of the power to be supplied to each circuit component. The power supply unit 110 supplies to the RF amplifier unit 101 and so on the powers of the intensities indicated by the power supply control signal.

The controller 300 generates such a power supply control signal on the basis of the MER measurement value sent from the demodulator 200; and then outputs the generated power supply control signal to the tuner 100. That is, the controller 300 detects the signal reception condition of the cellular phone 1000 on the basis of the MER measurement value. On the basis of the detection result, the controller 300 generates a control signal such that the power to be supplied to each circuit component is as low as possible.

More specifically, the controller 300 has detection reference values as references for judging whether or not the signal reception condition is good. The detection reference values include a power decrease reference value as a reference for decreasing power, and a power increase reference value as a reference for increasing power. The controller 300 compares the MER measurement value with the power decrease reference value. When the MER measurement value is more than the power decrease reference value, the controller 300 judges the signal reception condition to be good. On the other hand, the controller 300 compares the MER measurement value with the power increase reference value. When the MER measurement value is less than the power increase reference value, the controller 300 judges the signal reception condition not to be good. When the controller 300 judges the signal reception condition to be good, the controller 300 generates a power supply control signal to decrease the power to be supplied to each circuit component. On the other hand, when the controller 300 judges the signal reception condition not to be good, the controller 300 generates a power supply control signal to increase the power to be supplied to each circuit component. The power increase reference value is set to be higher by a predetermined value than the lower limit of the MER value that makes it possible to accurately reproduce image data and so on from the demodulated signal. The power decrease reference value is set to a MER value higher than the power increase reference value.

<Control Based On Fading Environment>

The signal reception condition of the cellular phone 1000 may vary with time. A cause of the variation in the signal reception condition is generation of fading. Fading is generated due to a difference in the state of the transmission path from the transmission source to the cellular phone 1000. For example, fading is generated when two signals different in transmission path are redundantly received by the cellular phone 1000. This is because, for example, the intensity of the received signal extremely lowers due to a difference in phase between the two signals. When the cellular phone 1000 is moving, the state of the transmission path varies to cause fading. This changes the signal reception condition.

In accordance with the fading environment in which the cellular phone 1000 is put, the manner of the variation in the signal reception condition variously changes. When the manner of the variation in the signal reception condition changes, there is possibility that the above-described control of the power to be supplied to each circuit component is not properly performed. For example, in a fading environment in which the signal reception condition frequently varies, there is possibility that the control of the power to be supplied can not follow the variation in the signal reception condition. On the other hand, in a fading environment in which the signal reception condition gently varies, if the power to be supplied is frequently controlled, the efficiency of the power control may lower as a whole. For example, even when the signal reception condition merely temporarily worsens, the power to be supplied may be quickly increased.

In the signal that reaches the cellular phone 1000, a Doppler shift is generated in accordance with the speed of the movement of the cellular phone 1000. For example, in a multipath environment in which two or more transmission paths exist, the cellular phone 1000 receives signals through the respective transmission paths, which signals are different in frequency by a Doppler frequency from each other. The Doppler frequency is proportional to the speed of the movement of the cellular phone 1000. The Doppler frequency indicates whether the fading environment is an environment in which the signal reception condition frequently varies or an environment in which the signal reception condition gently varies. Thus, by obtaining the Doppler frequency, the fading environment in which the cellular phone 1000 receives a signal can be estimated.

For the above reason, as shown in FIG. 3, the demodulator 200 of this embodiment includes a frequency deriving unit 207 for deriving the Doppler frequency of the Doppler shift generated in the signal received by the cellular phone 1000. The signal fast-Fourier-transformed by the FFT unit 203 is input to the frequency deriving unit 207. The frequency deriving unit 207 derives a Doppler frequency on the basis of the signal output from the FFT unit 203, and then outputs the derived Doppler frequency to the controller 300.

Specifically, the frequency deriving unit 207 derives a Doppler frequency as follows. When a Doppler shift is generated, subcarriers shift in frequency by a Doppler frequency. Therefore, the signal fast-Fourier-transformed by the FFT unit 203 contains frequency components other than the target frequency. The number of frequency components other than the target frequency increases as the Doppler frequency increases.

The frequency deriving unit 207 derives the Doppler frequency on the basis of a correlation value calculated between two unit signals belonging to different symbols of the same subcarrier. The two unit signals have been beforehand selected that have the same I value and the same Q value. The correlation value is calculated as the absolute value of the sum of the values obtained by multiplying the I values of the unit signals by each other and the Q values of the unit signals by each other. As described above, each subcarrier contains two scattered pilot signals having the same I value and the same Q value. Therefore, the scattered pilot signals can be used for the calculation of the correlation value. The larger the number of frequency components other than the target frequency contained in the fast-Fourier-transformed two scattered pilot signals, the smaller the calculated correlation value. Thus, the frequency deriving unit 207 derives the Doppler correlation value such that the derived value increases as the frequency decreases; and the derived value decreases as the correlation value increases. In this case, the Doppler frequency may be derived with the use of a table relating the correlation value and the Doppler frequency to each other; or by a calculating formula expressing the relation between the correlation value and the Doppler frequency.

Figure 4:
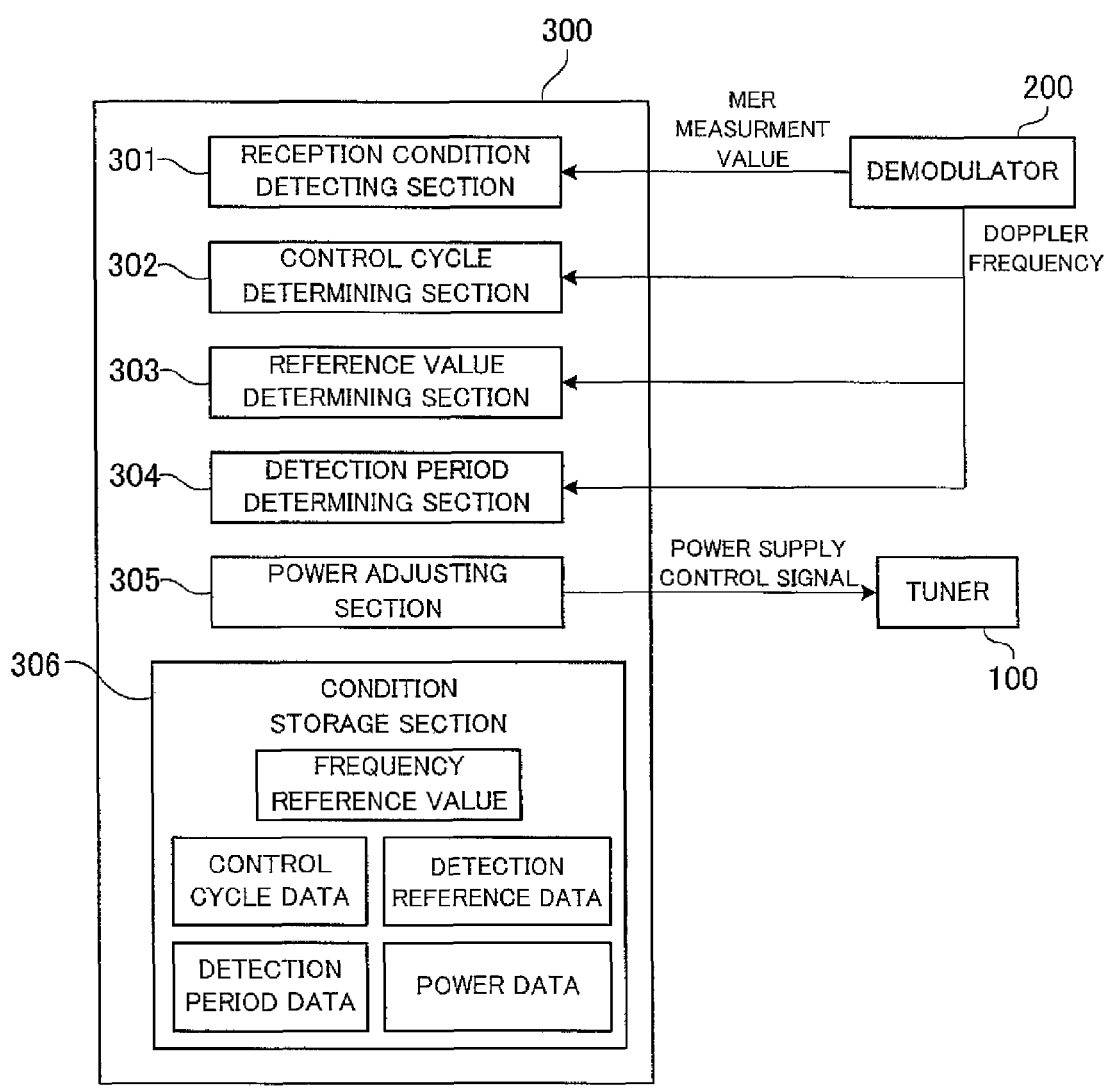
FIG. 4 is a block diagram showing a constitution of a controller shown in FIG. 1B.

The controller 300 generates a power supply control signal on the basis of not only the MER measurement value sent from the demodulator 200 but also the Doppler frequency. Next, the controller 300 will be more specifically described. As shown in FIG. 4, the controller 300 includes functional blocks such as a reception condition detecting section 301. The controller 300 is constituted by hardware devices including a general-purpose processor and memories; and computer programs that cause the hardware devices to function as the functional blocks shown in FIG. 4.

The reception condition detecting section 301 detects the current reception condition on the basis of MER measurement values sent from the demodulator 200. A condition storage section 306 stores therein detection period data that indicates the length of a detection period for detecting the reception condition. The reception condition detecting section 301 accumulates therein MER measurement values sent from the demodulator 200 over the detection period having its length indicated by the detection period data stored in the condition storage section 306. The reception condition detecting section 301 then calculates a mean value of the accumulated MER measurement values. The condition storage section 306 further stores therein detection reference data that indicates the above-described power decrease reference value and the above-described power increase reference value. The reception condition detecting section 301 compares the mean value of the MER measurement values with those reference values to detect the degree of goodness of the reception condition.

On the basis of the Doppler frequency sent from the demodulator 200, a control cycle determining section 302 determines a cycle for controlling the power to be supplied to each circuit component. The condition storage section 306 stores therein a frequency reference value relating to the Doppler frequency. The condition storage section 306 further stores therein control cycle data that indicates a cycle for controlling power in the tuner 100. The control cycle determining section 302 compares the derived value of the Doppler frequency sent from the demodulator with the frequency reference value stored in the condition storage section 306. On the basis of the comparison result, the control cycle determining section 302 determines a control cycle such that the frequency of performing controls increases as the Doppler frequency increases. Conversely, the control cycle determining section 302 determines a control cycle such that the frequency of performing controls decreases as the Doppler frequency decreases. The control cycle determining section 302 then updates the control cycle data in the condition storage section 306 to the newly determined value. Thereby, the frequency of power controls is increased in a fading environment in which the reception condition is apt to vary. Conversely, the frequency of power controls is decreased in a fading environment in which the reception condition is hard to vary.

On the basis of the derived value of the Doppler frequency sent from the demodulator 200, a reference value determining section 303 determines reference values relating to the MER measurement value. More specifically, the reference value determining section 303 compares the derived value of the Doppler frequency sent from the demodulator 200 with the frequency reference value stored in the condition storage section 306. On the basis of the comparison result, the reference value determining section 303 updates the detection reference data in the condition storage section 306 such that the power increase reference value and the power decrease reference value increase as the Doppler frequency increases. Conversely, the reference value determining section 303 updates the detection reference data in the condition storage section 306 such that the power increase reference value and the power decrease reference value decrease as the Doppler frequency decreases. Thereby, in the case of a fading environment in which the reception condition is apt to vary, the reception condition detecting section 301 can easily judge the reception condition not to be good. Conversely, in the case of a fading environment in which the reception condition is hard to vary, the reception condition detecting section 301 can easily judge the reception condition to be good.

On the basis of the derived value of the Doppler frequency sent from the demodulator 200, a detection period determining section 304 determines the length of a detection period for detecting the reception condition. More specifically, the detection period determining section 304 compares the derived value of the Doppler frequency sent from the demodulator 200 with the frequency reference value stored in the condition storage section 306. On the basis of the comparison result, the detection period determining section 304 updates the detection period data in the condition storage section 306 such that the detection period is shortened as the Doppler frequency increases. Conversely, the detection period determining section 304 updates the detection period data in the condition storage section 306 such that the detection period is lengthened as the Doppler frequency decreases. Thereby, in the case of a fading environment in which the reception condition is apt to vary, the detection result of the reception condition detecting section 301 can easily reflect the variation in the reception condition for a short period. Conversely, in the case of a fading environment in which the reception condition is hard to vary, the detection result of the reception condition detecting section 301 can not easily reflect the variation in the reception condition for a short period; and reflects a gentle variation for a long period.

A power adjusting section 305 generates a power supply control signal on the basis of the detection result of the reception condition detecting section 301, and then outputs the generated power supply control signal to the tuner 100. The condition storage section 306 stores therein power data that indicates the power to be supplied to each circuit component in the tuner 100. When the reception condition detecting section 301 judges the reception condition to be good, the power adjusting section 305 updates the power data in the condition storage section 306 so as to indicate lower powers. Conversely, when the reception condition detecting section 301 judges the reception condition not to be good, the power adjusting section 305 updates the power data in the condition storage section 306 so as to indicate higher powers. The power adjusting section 305 generates a power supply control signal corresponding to the power data currently stored in the condition storage section 306, and then outputs the generated power supply control signal to the tuner 100. The power adjusting section 305 performs the above-described generation of the power supply signal and output of the generated data at a frequency corresponding to the control cycle indicated by the control cycle data stored in the condition storage section 306. That is, at a timing corresponding to the control cycle indicated by the control cycle data, the power adjusting section 305 generates a power supply control signal and outputs the generated signal to the tuner 100.

Figure 5:
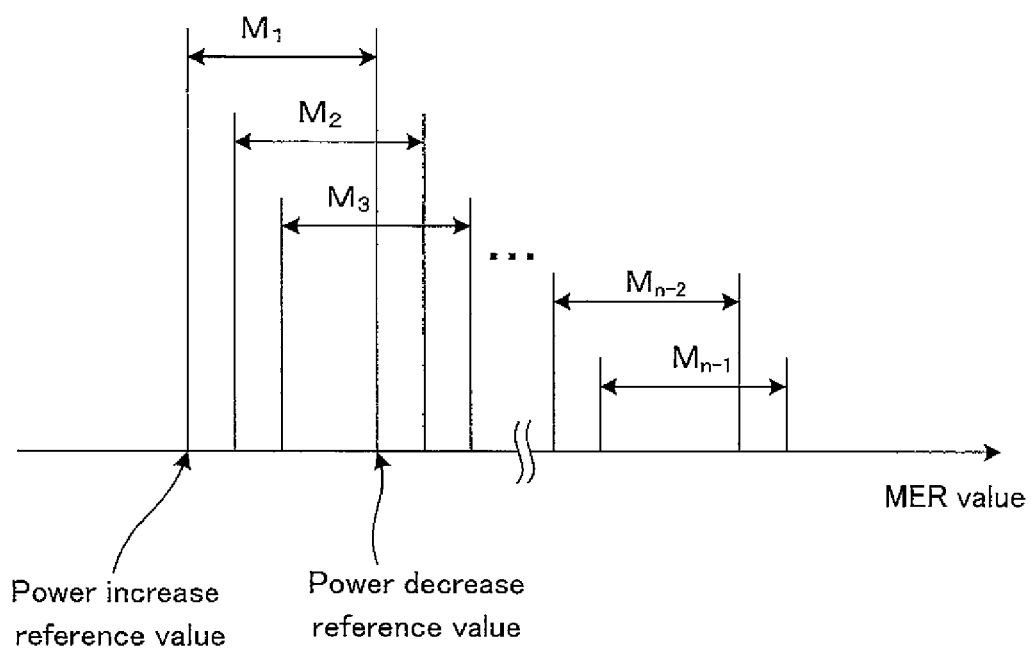
FIG. 5 is a graph showing ranges of detection reference values to be used for the controller of FIG. 4 to detect the reception condition.

More specifically, the control cycle, the detection reference range, and the detection period can be determined, for example, as follows. The condition storage section 306 stores therein data that indicates the below Table 1. Respective parameters in Table 1 show the frequency value, the time value, and the MER value. The parameters in Table 1 satisfy the condition that $f_1$ smaller than $f_2$ ... smaller than $f_n$, $T_1$ larger than $T_2$ ... larger than $T_{n-1}$ and $P_1$ larger than $P_2$ ... larger than $P_{n+1}$, where n is a natural number of two or more. A symbol $M_k$ represents a range of MER values the upper limit of which corresponds to the power decrease reference value, and the lower limit of which corresponds to the power increase reference value, where k is a natural number of one to n−1. The respective ranges on a number line in FIG. 5 correspond to the ranges represented by $M_k$. As shown in FIG. 5, the power decrease reference value of $M_k$ satisfies the condition that the power decrease reference value of $M_1$ smaller than the power decrease reference value of $M_2$ ... smaller than the power decrease reference value of $M_{n-1}$. The power increase reference value of $M_k$ satisfies the condition that the power increase reference value of $M_1$ smaller than the power increase reference value of $M_2$ ... smaller than the power increase reference value of $M_{n-1}$.

TABLE 1

| | Frequency reference range | Reception condition detection period | Control cycle | Detection reference range |
|---|---|---|---|---|
| 1 | smaller than $f_1$ | stop power control | $P_1$ | stop power control |
| 2 | $f_1$ to $f_2$ | $T_1$ | $P_2$ | $M_1$ |
| ... | ... | ... | ... | ... |
| n | $f_{n-1}$ to $f_n$ | $T_{n-1}$ | $P_n$ | $M_{n-1}$ |
| n + 1 | more than $f_n$ | stop power control | $P_{n+1}$ | stop power control |

The condition storage section 306 stores therein condition number data that indicates one of the natural numbers of one to n+1. The numeric value of this data indicates which of the power control conditions in Table 1 is currently set. Each of the control cycle determining section 302, the reference value determining section 303, and the detection period determining section 304 decides which of the conditions of one to n+1 in Table 1 the derived value of the Doppler frequency sent from the demodulator 200 corresponds to. Each section then updates the condition number data in the condition storage section 306, and determines its control condition to a control cycle or the like indicated by the updated condition number data.

For example, it is assumed that the derived value of the Doppler frequency sent from the demodulator 200 is within a range of $f_2$ to $f_3$. In this case, the condition number data is set to three. In addition, the control cycle, the detection reference range, and the detection period are set to $P_3$, $M_2$, and $T_2$, respectively. It is further assumed that the derived value of the Doppler frequency sent from the demodulator 200 exceeds $f_3$ from the above state. In the present invention, this corresponds to an example of a case in which the Doppler frequency exceeds a first frequency reference value. In this case, referring to Table 1, each of the control cycle determining section 302, the reference value determining section 303, and the detection period determining section 304 updates the condition number data to four. The control cycle determining section 302, the reference value determining section 303, and the detection period determining section 304 then determine the control cycle, the detection reference range, and the detection period to $P_4$, $M_3$, and $T_3$, respectively. On the other hand, it is assumed that the derived value of the Doppler frequency sent from the demodulator 200 becomes less than $f_2$ from the state in which the condition number is set to three. In the present invention, this corresponds to an example of a case in which the Doppler frequency becomes less than a second frequency reference value. In this case, referring to Table 1, each of the control cycle determining section 302, the reference value determining section 303, and the detection period determining section 304 updates the condition number data to two. The control cycle determining section 302, the reference value determining section 303, and the detection period determining section 304 then determine the control cycle, the detection reference range, and the detection period to $P_2$, $M_1$, and $T_1$, respectively.

As described above, the control cycle, the detection reference range, and the detection period are determined in accordance with Table 1. The condition number data is incremented as the derived value of the Doppler frequency increases, that is, the reception condition becomes easier to vary. The control cycle and the detection period are shortened accordingly. In addition, a detection reference range is set so that the reception condition is apt to be judged not to be good. Conversely, the condition number data is decremented as the derived value of the Doppler frequency decreases, that is, the reception condition becomes harder to vary. The control cycle and the detection period are lengthened accordingly. In addition, a detection reference range is set so that the reception condition is apt to be judged to be good.

In Table 1, it is assumed that the power control itself is stopped when the derived value of the Doppler frequency exceeds $f_n$ that is the maximum of the frequency reference value. This is for the following reason. When the Doppler frequency exceeds the maximum reference value $f_n$, the fading environment remarkably varies and thus the reception condition frequently varies. In this case, it is considered that the control itself for reducing power becomes impossible. Similarly, it is assumed that the power control is stopped when the Doppler frequency becomes less than $f_1$ that is the minimum of the frequency reference value. When the Doppler frequency is less than $f_1$, the fading environment very gently varies. However, when the Doppler frequency is very low, there is possibility of generation of a sudden variation in the reception condition in a very long cycle. Also in this case, because the signal reception becomes difficult, it is considered that the control itself for reducing power becomes impossible.

In a modification, even when the Doppler frequency is less than $f_1$, the power control may be continued without being stopped. In this modification, the control is preferably performed in a detection reference range in which the reception condition is more apt to be judged not to be good in comparison with the case of the detection reference range $M_1$. For example, the control may be performed in a reference range equal to $M_{n-1}$. Additionally in this modification, $P_1$ is preferably set to be less than $P_2$. For example, $P_1$ can be set to be equal to $P_{n+1}$. Thereby, even when a sudden variation in the reception condition is generated in a very long cycle, as described above, a proper power control can be performed that can follow the variation in the reception condition.

<Power Control Flow>

Figure 6:
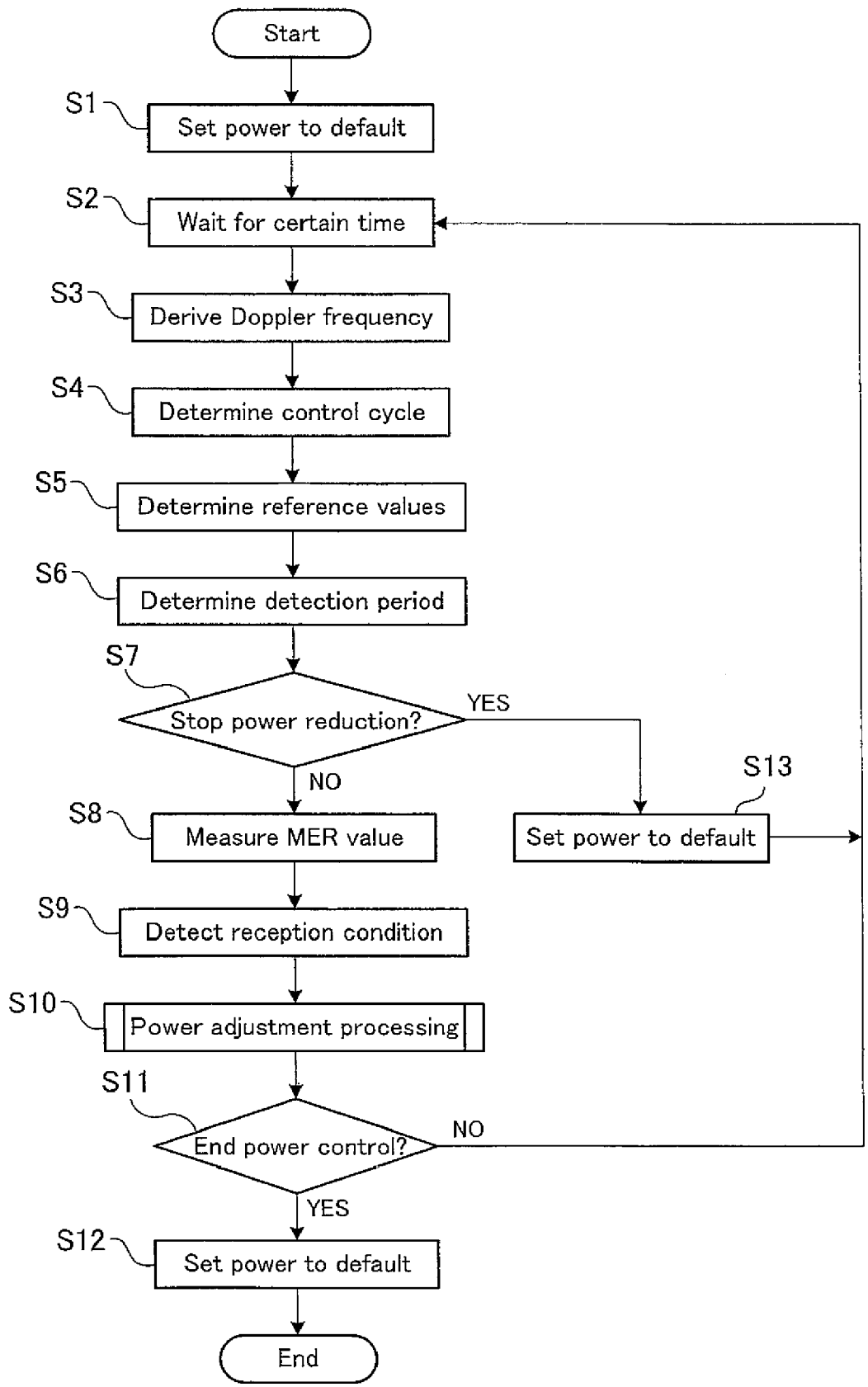
FIG. 6 is a flowchart of processing to be executed by the controller of FIG. 4.

Next, the flow of processing to be executed by the controller 300 will be more specifically described with reference to the flowchart of FIG. 6.

In Step S1, the controller 300 sets the power to be supplied to each circuit component, to its default value; and stores the default value in the condition storage section 306. The power adjusting section 305 then generates a power supply control signal corresponding to the default value, and outputs the generated power supply control signal to the tuner 100. The default value has been set so as to have a certain margin on the assumption of the worst reception condition.

In Step S2, the controller 300 waits for a certain time period. The waiting time has been set in accordance with the control cycle data stored in the condition storage section 306. More specifically, the longer the control cycle indicated by the control cycle data, the longer the set waiting time. Conversely, the shorter the control cycle indicated by the control cycle data, the shorter the set waiting time.

In Step S3, the frequency deriving unit 207 derives the Doppler frequency. In Step S4, on the basis of the Doppler frequency derived by the frequency deriving unit 207, the control cycle determining section 302 determines a control cycle. In Step S5, on the basis of the Doppler frequency derived by the frequency deriving unit 207, the reference value determining section 303 determines a detection reference range. In Step S6, on the basis of the Doppler frequency derived by the frequency deriving unit 207, the detection period determining section 304 determines a length of detection period. Data indicating the control cycle, the detection reference range, and the detection period, determined in Steps S4 to S6, is stored in the condition storage section 306.

In Step S7, the controller 300 judges by the Doppler frequency whether or not power reduction control should be stopped. More specifically, the controller 300 judges whether or not the Doppler frequency is within a range in which the power reduction control can be performed. For example, in the case of referring to Table 1, when the Doppler frequency is less than $f_1$ or more than $f_n$, the controller 300 decides that the Doppler frequency is out of the range in which the power reduction control can be performed. When the controller 300 decides that the Doppler frequency is not within the range in which the power reduction control can be performed, that is, YES in Step S7, the flow advances to Step S13, in which the controller 300 reverts the value of the power stored in the condition storage section 306, to its default value. The controller 300 then executes processing from Step S2.

When the controller 300 decides that the Doppler frequency is within the range in which the power reduction control can be performed, that is, NO in Step S7, the flow advances to Step S8, in which the reception condition detecting section 301 accumulates therein MER measurement values sent from the demodulator 200 over the time period indicated by the detection period data stored in the condition storage section 306. In Step S9, the reception condition detecting section 301 calculates a mean value of the accumulated MER measurement values, and detects the reception condition on the basis of the mean value. More specifically, the reception condition detecting section 301 detects one of three states that: (a) the reception condition is good; (b) the reception condition is not good; and (c) the power control should be reset. When the mean value is more than the power decrease reference value stored in the condition storage section 306, the reception condition detecting section 301 judges the reception condition to be good. When the mean value is less than a predetermined reset reference value less than the power increase reference value, the reception condition detecting section 301 decides that the power control should be reset. When the mean value is not less than the reset reference value and less than the power increase reference value stored in the condition storage section 306, the reception condition detecting section 301 judges the reception condition not to be good.

Figure 7:
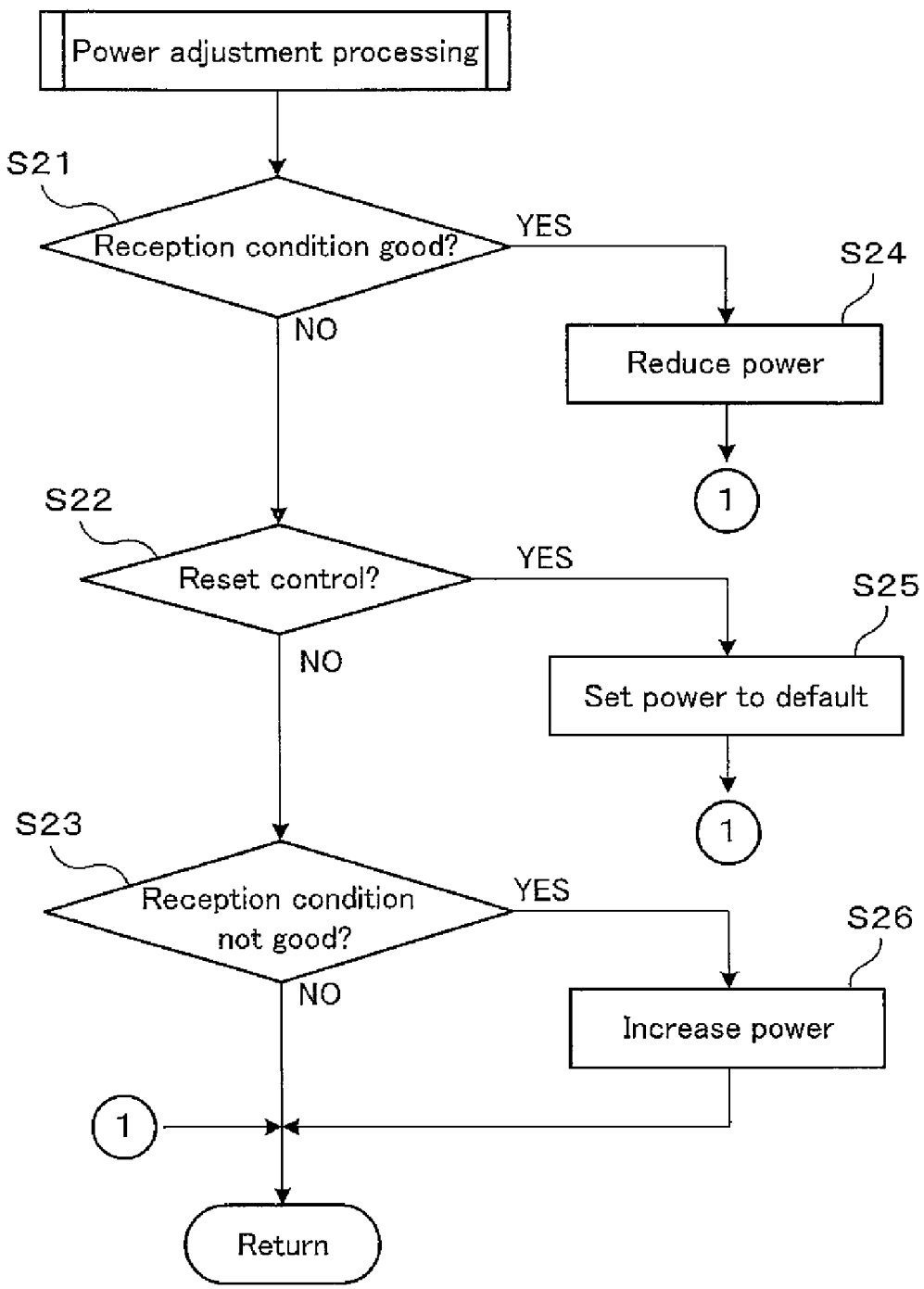
FIG. 7 is a flowchart of a subroutine to be called in the procedure of FIG. 6.

In Step S10, on the basis of the result of the reception condition detection in Step S9, the controller 300 executes power adjustment processing as shown in FIG. 7. In Step S11, the controller 300 judges whether or not the power control should be ended. For example, on the basis of whether or not the tuner 100 ends its signal reception, the controller 300 judges whether or not the power control should be ended. When the controller 300 decides that the power control should be ended, that is, YES in Step S11, the flow advances to Step S12, in which the controller 300 sets the power value stored in the condition storage section 306 to its default value. The flow then ends. On the other hand, when the controller 300 decides that the power control should be continued, that is, NO in Step S1, the flow returns to Step S2.

Next, power adjustment processing of FIG. 7 will be described. The power adjusting section 305 adjusts power on the basis of which of the above (a) to (c) the result of the judgment by the reception condition detecting section 301 in Step S9 of FIG. 6 indicates. First, in Step S21, the power adjusting section 305 judges whether or not the judgment result of the reception condition detecting section 301 is (a), that is, whether or not the reception condition detecting section 301 has judged the reception condition to be good. When the power adjusting section 305 decides that the judgment result of the reception condition detecting section 301 is (a), that is, YES in Step S21, the flow advances to Step S24. In Step S24, the power adjusting section 305 decreases the power value stored in the condition storage section 306. In addition, the power adjusting section 305 generates a power supply control signal corresponding to the decreased power value, and then outputs the generated power supply control signal to the tuner 100. The flow then returns to Step S11 of FIG. 6. On the other hand, when the power adjusting section 305 decides in Step S21 that the judgment result of the reception condition detecting section 301 is not (a), that is, NO in Step S21, the flow advances to Step S22, in which the power adjusting section 305 judges whether or not the judgment result of the reception condition detecting section 301 is (c), that is, whether or not the reception condition is in a state that the power control should be reset. When the power adjusting section 305 decides that the judgment result of the reception condition detecting section 301 is (c), that is, YES in Step S22, the flow advances to Step S25. In Step S25, the power adjusting section 305 sets the power value stored in the condition storage section 306 to its default value. In addition, the power adjusting section 305 generates a power supply control signal corresponding to the default value, and then outputs the generated power supply control signal to the tuner 100. The flow then returns to Step S11 of FIG. 6. On the other hand, when the power adjusting section 305 decides in Step S22 that the judgment result of the reception condition detecting section 301 is not (c), that is, NO in Step S22, the flow advances to Step S23, in which the power adjusting section 305 judges whether or not the judgment result of the reception condition detecting section 301 is (b), that is, whether or not the reception condition detecting section 301 has judged the reception condition not to be good. When the power adjusting section 305 decides that the judgment result of the reception condition detecting section 301 is (b), that is, YES in Step S23, the flow advances to Step S26. In Step S26, the power adjusting section 305 increases the power value stored in the condition storage section 306. In addition, the power adjusting section 305 generates a power supply control signal corresponding to the increased power value, and then outputs the generated power supply control signal to the tuner 100. The flow then returns to Step S11 of FIG. 6. On the other hand, when the power adjusting section 305 decides in Step S23 that the judgment result of the reception condition detecting section 301 is not (b), that is, NO in Step S23, then the flow returns to Step S11 of FIG. 6.

In the above-described embodiment, the MER measurement value is compared with the power increase reference value and the power decrease reference value. The power to be supplied to each circuit component is adjusted in accordance with the comparison result. Thus, a proper power control is performed that matches the degree of goodness of the reception condition.

In addition, the Doppler frequency is compared with the frequency reference value. The power control is performed in accordance with the comparison result. More specifically, in the case of a fading environment in which the reception condition frequently varies, the number of times of power controls per time is increased. On the other hand, in the case of a fading environment in which the reception condition gently varies, the number of times of power controls per time is decreased. Thus, because the number of times of controls is increased when the reception condition frequently varies, the controls become easy to follow the variation in the reception condition. On the other hand, because the number of times of controls is decreased when the reception condition gently varies, this suppresses a reduction in the control efficiency.

Further, the detection reference for the reception condition is adjusted in accordance with the result of the comparison of the Doppler frequency with the frequency reference value. More specifically, in the case of a fading environment in which the reception condition frequently varies, the detection reference is changed so that the reception condition is hard to be judged to be good. On the other hand, in the case of a fading environment in which the reception condition gently varies, the detection reference is changed so that the reception condition is apt to be judged to be good. Thus, when the reception condition frequently varies, a control is performed that is hard to decrease the power to be supplied to each circuit component. On the other hand, when the reception condition gently varies, a control is performed that is apt to decrease the power to be supplied to each circuit component.

Further, the detection period for the reception condition is adjusted in accordance with the result of the comparison of the Doppler frequency with the frequency reference value. More specifically, in the case of a fading environment in which the reception condition frequently varies, the detection period for the reception condition is shortened. On the other hand, in the case of a fading environment in which the reception condition gently varies, the detection period for the reception condition is lengthened. Thus, when the reception condition frequently varies, the detection result of the reception condition is easy to reflect a short-time variation. On the other hand, when the reception condition gently varies, the detection result of the reception condition is hard to reflect a short-time variation, and easier to reflect a long-time variation.

As described above, in this embodiment, a power control is performed that can properly follow a variation in the reception condition.

<Modifications>

A preferred embodiment of the present invention has been described above. However, the present invention is never limited to the above-described embodiment. Various changes can be made within the scope of the present invention.

For example, in the above-described embodiment, the frequency of the Doppler shift is derived that has been generated in a signal to be received by the cellular phone 1000. The fading environment when the cellular phone 1000 receives the signal is estimated on the basis of the frequency of the Doppler shift. In a modification, however, the fading environment may be estimated on the basis of information other than information obtained from the received signal. For example, when a digital demodulating apparatus of the present invention is placed in a moving vehicle, the speed of the vehicle is directly obtained from the speed meter of the vehicle. The variability in the fading environment may be estimated from the obtained speed.

In the above-described embodiment, a mean value of MER measurement values is calculated that have been accumulated over a predetermined detection period. The reception condition is detected on the basis of the calculated value. In a modification, however, the reception condition may be detected on the basis of a distribution condition of MER measurement values accumulated over a predetermined detection period. For example, a variance of the accumulated MER measurement values is calculated, and the distribution condition of the MER measurement values is obtained on the basis of the variance. The reception condition may be detected on the basis of the distribution condition.

In the above-described embodiment, all of the control cycle, the detection reference values for the reception condition, and the detection period for the reception condition are adjusted on the basis of the Doppler frequency. In a modification, however, only one or two of them may be adjusted.

In the above-described embodiment, the controller 300 detects the reception condition on the basis of the MER measurement value sent from the demodulator 200. In a modification, however, the reception condition may be detected on the basis of the BER value sent from the demodulator 200. In another modification, the reception condition may be detected with the use of both of MER and BER. In the case of using BER, the BER value sent from the demodulator 200 is compared with detection reference values relating to BER. On the basis of the comparison result, it is judged whether or not the reception condition is good.

In the above-described embodiment, it is assumed that the Doppler frequency is derived on the basis of the correlation between two scattered pilot signals. In a modification, however, the Doppler frequency may be derived on the basis of not the scattered pilot signals but TMCC signals. In another modification, the Doppler frequency may not be derived on the basis of the correlation between two signals. For example, on the basis of a signal sent from the FFT unit 203, the Doppler frequency may be derived from a distribution condition of frequency components other than the target frequency component, which are contained in the fast-Fourier-transformed signal due to the Doppler shift.

In the above-described embodiment, the reception condition is judged by the result of comparison of the MER measurement value with the detection reference values. The power value is controlled in accordance with the judgment result. In this case, a table or calculating formula may be prepared in advance that indicates a relation of the MER measurement value to the power value to be supplied to each circuit component; to determine the power value with the use of the table or calculating formula.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A digital demodulating apparatus comprising:
   circuit components constituting a tuner that applies channel select processing to a received signal, and a demodulator that demodulates the signal to which the tuner has applied channel select processing;
   a power supply unit that supplies power to each circuit component;
   a reception condition detecting unit that detects a reception condition when the tuner receives the signal;
   a power adjusting unit that adjusts the power to be supplied to each circuit component by the power supply unit, on the basis of a result of the detection by the reception condition detecting unit;
   a fading environment estimating unit that estimates a fading environment when the tuner receives the signal; and
   a power controlling unit that controls the power adjusting unit on the basis of a result of the estimation by the fading environment estimating unit so that the number of times of adjustments of the power by the power adjusting unit per unit time changes in accordance with the variability of the reception condition.

2. The apparatus according to claim 1, wherein the fading environment estimating unit comprises a frequency deriving unit that derives a Doppler frequency of a Doppler shift that has been generated in the signal received by the tuner.

3. The apparatus according to claim 2, wherein the power controlling unit controls the power adjusting unit to increase the number of times of adjustments of the power by the power adjusting unit per unit time when the Doppler frequency derived by the frequency deriving unit exceeds a predetermined frequency reference value.

4. The apparatus according to claim 2, wherein the power controlling unit controls the power adjusting unit to decrease the number of times of adjustments of the power by the power adjusting unit per unit time when the Doppler frequency derived by the frequency deriving unit becomes less than a predetermined frequency reference value.

5. The apparatus according to claim 2, wherein the apparatus further comprises an evaluation value deriving unit that derives at least one of a modulation error ratio (MER) value and a bit error rate (BER) value when the signal is demodulated,
the reception condition detecting unit detects the reception condition on the basis of a result of the derivation by the evaluation value deriving unit over a predetermined time period, and
the power controlling unit controls the reception condition detecting unit to shorten the predetermined time period when the Doppler frequency derived by the frequency deriving unit exceeds a predetermined frequency reference value.

6. The apparatus according to claim 2, wherein the apparatus further comprises an evaluation value deriving unit that derives at least one of a modulation error ratio (MER) value and a bit error rate (BER) value when the signal is demodulated,
the reception condition detecting unit detects the reception condition on the basis of a result of the derivation by the evaluation value deriving unit over a predetermined time period, and
the power controlling unit controls the reception condition detecting unit to lengthen the predetermined time period when the Doppler frequency derived by the frequency deriving unit becomes less than a predetermined frequency reference value.

7. The apparatus according to claim 2, wherein the power controlling unit controls the power adjusting unit to increase the number of times of adjustments of the power by the power adjusting unit per unit time when the Doppler frequency derived by the frequency deriving unit exceeds a first frequency reference value, and to decrease the number of times of adjustments of the power by the power adjusting unit per unit time when the Doppler frequency derived by the frequency deriving unit becomes less than a second frequency reference value that is not more than the first frequency reference value.

8. The apparatus according to any of claim 2, wherein the apparatus further comprises an evaluation value deriving unit that derives at least one of a modulation error ratio (MER) value and a bit error rate (BER) value when the signal is demodulated,
the reception condition detecting unit detects the reception condition on the basis of a result of the derivation by the evaluation value deriving unit over a predetermined time period, and
the power controlling unit controls the reception condition detecting unit to shorten the predetermined time period when the Doppler frequency derived by the frequency deriving unit exceeds a first frequency reference value, and to lengthen the predetermined time period when the Doppler frequency derived by the frequency deriving unit becomes less than a second frequency reference value that is not more than the first frequency reference value.

9. The apparatus according to any of claim 2, wherein the power controlling unit allows the power adjusting unit to adjust the power only when the Doppler frequency derived by the frequency deriving unit is within a range in which the power to be supplied to each circuit component can be reduced.

10. The apparatus according to any of claim 1, wherein the power adjusting unit adjusts the power to be supplied to each circuit component so that the power is reduced as the goodness of the reception condition indicated by the detection result of the reception condition detecting unit is improved.

11. A digital demodulating apparatus comprising:
circuit components constituting a tuner that applies channel select processing to a received signal, and a demodulator that demodulates the signal to which the tuner has applied channel select processing;
a power supply unit that supplies power to each circuit component;
an evaluation value deriving unit that derives as an evaluation value of the reception condition at least one of a modulation error ratio (MER) value and a bit error rate (BER) value when the signal is demodulated;
a reception condition detecting unit that compares a result of the derivation by the evaluation value deriving unit with a reference value relating to the evaluation value, and outputs a result of the comparison as a detection result of the reception condition when the tuner receives the signal;
a power adjusting unit that adjusts the power to be supplied to each circuit component by the power supply unit, on the basis of the result of the detection by the reception condition detecting unit;
a fading environment estimating unit that estimates a fading environment when the tuner receives the signal; and
a reference value changing unit that changes the reference value relating to the evaluation value into a value in accordance with the variability of the reception condition, on the basis of a result of the estimation by the fading environment estimating unit.

12. The apparatus according to claim 11, wherein the fading environment estimating unit comprises a frequency deriving unit that derives a Doppler frequency of a Doppler shift that has been generated in the signal received by the tuner.

13. The apparatus according to claim 12, wherein the reference value changing unit changes the reference value relating to the evaluation value so that the comparison result of the reception condition detecting unit becomes harder to indicate that the reception condition is good when the Doppler frequency derived by the frequency deriving unit exceeds a predetermined frequency reference value.

14. The apparatus according to claim 12, wherein the reference value changing unit changes the reference value relating to the evaluation value so that the comparison result of the reception condition detecting unit becomes more apt to indicate that the reception condition is good when the Doppler frequency derived by the frequency deriving unit becomes less than a predetermined frequency reference value.

15. The apparatus according to claim 12, wherein the reference value changing unit changes the reference value relating to the evaluation value so that the comparison result of the reception condition detecting unit becomes harder to indicate that the reception condition is good when the Doppler frequency derived by the frequency deriving unit exceeds a first frequency reference value; and more apt to indicate that the reception condition is good when the Doppler frequency derived by the frequency deriving unit becomes less than a second frequency reference value that is not more than the first frequency reference value.

16. The apparatus according to claim 15, wherein the reference value changing unit changes the reference value relating to the evaluation value so that the comparison result of the reception condition detecting unit becomes harder to indicate that the reception condition is good when the Doppler frequency derived by the frequency deriving unit becomes less than a third frequency reference value that is less than the second frequency reference value.

17. The apparatus according to any of claim 11, wherein the power adjusting unit adjusts the power to be supplied to each circuit component so that the power is reduced as the goodness of the reception condition indicated by the detection result of the reception condition detecting unit is improved.

18. A digital receiver comprising:
circuit components constituting a tuner that applies channel select processing to a received signal, and a demodulator that demodulates the signal to which the tuner has applied channel select processing;
a power supply unit that supplies power to each circuit component;
a reception condition detecting unit that detects a reception condition when the tuner receives the signal;
a power adjusting unit that adjusts the power to be supplied to each circuit component by the power supply unit, on the basis of a result of the detection by the reception condition detecting unit;
a fading environment estimating unit that estimates a fading environment when the tuner receives the signal; and
a power controlling unit that controls the power adjusting unit on the basis of a result of the estimation by the fading environment estimating unit so that the number of times of adjustments of the power by the power adjusting unit per unit time changes in accordance with the variability of the reception condition,
the receiver reproducing at least one of character data, image data, computer program data, and sound data on the basis of the demodulated signal from the demodulator.

19. A digital receiver comprising:
circuit components constituting a tuner that applies channel select processing to a received signal, and a demodulator that demodulates the signal to which the tuner has applied channel select processing;
a power supply unit that supplies power to each circuit component;
an evaluation value deriving unit that derives as an evaluation value of the reception condition at least one of a modulation error ratio (MER) value and a bit error rate (BER) value when the signal is demodulated;
a reception condition detecting unit that compares a result of the derivation by the evaluation value deriving unit with a reference value relating to the evaluation value, and outputs a result of the comparison as a detection result of the reception condition when the tuner receives the signal;
a power adjusting unit that adjusts the power to be supplied to each circuit component by the power supply unit, on the basis of the result of the detection by the reception condition detecting unit;
a fading environment estimating unit that estimates a fading environment when the tuner receives the signal; and
a reference value changing unit that changes the reference value relating to the evaluation value into a value in accordance with the variability of the reception condition, on the basis of a result of the estimation by the fading environment estimating unit,
the receiver reproducing at least one of character data, image data, computer program data, and sound data on the basis of the demodulated signal from the demodulator.

20. A controlling method of a digital demodulating apparatus comprising circuit components constituting a tuner that applies channel select processing to a received signal, and a demodulator that demodulates the signal to which the tuner has applied channel select processing; and a power supply unit that supplies power to each circuit component,
the method comprising:
a reception condition detecting step of detecting a reception condition when the tuner receives the signal;
a power adjusting step of adjusting the power to be supplied to each circuit component by the power supply unit, on the basis of a result of the detection in the reception condition detecting step;
a fading environment estimating step of estimating a fading environment when the tuner receives the signal; and
a controlling step of controlling the power adjustment in the power adjusting step on the basis of a result of the estimation in the fading environment estimating step so that the number of times of adjustments of the power per unit time changes in accordance with the variability of the reception condition.

21. A controlling method of a digital demodulating apparatus comprising circuit components constituting a tuner that applies channel select processing to a received signal, and a demodulator that demodulates the signal to which the tuner has applied channel select processing; and a power supply unit that supplies power to each circuit component,
the method comprising:
an evaluation value deriving step of deriving as an evaluation value at least one of a modulation error ratio (MER) value and a bit error rate (BER) value when the signal is demodulated;
a comparing step of comparing a result of the derivation in the evaluation value deriving step with a reference value relating to the evaluation value;
a reception condition detecting step of detecting the reception condition when the tuner receives the signal, on the basis of a result of the comparison in the comparing step;
a power adjusting step of adjusting the power to be supplied to each circuit component by the power supply unit, on the basis of a result of the detection in the reception condition detecting step;
a fading environment estimating step of estimating a fading environment when the tuner receives the signal; and
a reference value changing step of changing the reference value relating to the evaluation value into a value in accordance with the variability of the reception condition, on the basis of a result of the estimation in the fading environment estimating step.

22. A non-transitory computer-readable recording medium recording thereon a computer program product for a digital demodulating apparatus comprising circuit components constituting a tuner that applies channel select processing to a received signal, and a demodulator that demodulates the signal to which the tuner has applied channel select processing; and a power supply unit that supplies power to each circuit component, the product causing the apparatus to execute:
a reception condition detecting step of detecting a reception condition when the tuner receives the signal;
a power adjusting step of adjusting the power to be supplied to each circuit component by the power supply unit, on the basis of a result of the detection in the reception condition detecting step;
a fading environment estimating step of estimating a fading environment when the tuner receives the signal; and
a controlling step of controlling the power adjustment in the power adjusting step on the basis of a result of the estimation in the fading environment estimating step so that the number of times of adjustments of the power per unit time changes in accordance with the variability of the reception condition.

23. A non-transitory computer-readable recording medium recording thereon a computer program product for a digital demodulating apparatus comprising circuit components constituting a tuner that applies channel select processing to a received signal, and a demodulator that demodulates the signal to which the tuner has applied channel select processing; and a power supply unit that supplies power to each circuit component, the product causing the apparatus to execute:
an evaluation value deriving step of deriving as an evaluation value at least one of a modulation error ratio (MER) value and a bit error rate (BER) value when the signal is demodulated;
a comparing step of comparing a result of the derivation in the evaluation value deriving step with a reference value relating to the evaluation value;
a reception condition detecting step of detecting the reception condition when the tuner receives the signal, on the basis of a result of the comparison in the comparing step;
a power adjusting step of adjusting the power to be supplied to each circuit component by the power supply unit, on the basis of a result of the detection in the reception condition detecting step;
a fading environment estimating step of estimating a fading environment when the tuner receives the signal; and
a reference value changing step of changing the reference value relating to the evaluation value into a value in accordance with the variability of the reception condition, on the basis of a result of the estimation in the fading environment estimating step.

* * * * *